Dec. 30, 1958 R. SHEPHERD 2,866,516
DEHYDRATION ARRANGEMENT
Filed Dec. 7, 1956

INVENTOR.
Roy Shepherd
BY

United States Patent Office 2,866,516
Patented Dec. 30, 1958

2,866,516

DEHYDRATION ARRANGEMENT

Roy Shepherd, Sands Springs, Okla., assignor to Graver Tank & Mfg. Co., Inc., East Chicago, Ind., a corporation of Delaware Application December 7, 1956, Serial No. 626,933

1 Claim. (Cl. 183—2.7)

The invention relates to an apparatus to accomplish dehydration of gas and is particularly useful in natural gas gathering systems that may be employed in petroleum refining.

The invention comprehends an improved arrangement designed to efficiently remove water from natural gas to prevent hydrate formation during treatment, to prevent corrosion which could occur from the combination of water vapor with carbon dioxide and oxygen in the gas and to further increase line capacity. Particularly, the invention comprehends the dehydration of natural gas using glycol by intimately contacting the glycol liquid with the gas in an absorber tower. The glycol used may be either de-ethylene or tri-ethylene. Arrangements of this type that have heretofore been used in the art have presented certain difficulties in the operation thereof. It has been found that appreciable amounts of liquid hydrocarbons have become associated with or entrained in the gas being dehydrated. These hydrocarbons have been commonly known as distillate, condensate or casing head gasoline. The presence of this distillate has caused overloading of the reboiler employed in the arrangement with a consequent lack of efficiency in regenerating the glycol. It further presents a fire hazard because of the presence of inflammable vapors. Additionally, the contamination of the glycol solution has resulted in a loss of glycol as well as materially effecting the efficiency with which the dehydration process is carried on by causing glycol foaming on the contacter trays.

Accordingly, it is a general object of the invention to provide a novel dehydrator arrangement having more efficient operation.

It is a specific object of the invention to provide an arrangement of the type described which substantially reduces and tends to eliminate the presence of distillates, that is liquid hydrocarbons, and provide resulting improved operation and elimination of the mentioned disadvantages heretofore associated with the operation of this type of equipment.

It is a further specific object of the invention to provide novel structure to accommodate distillate draw off in an absorber tower used in the arrangement described.

These and other objects of the invention will become apparent in the course of the following description and from an examination of the associated drawings, wherein.

Figure 1:
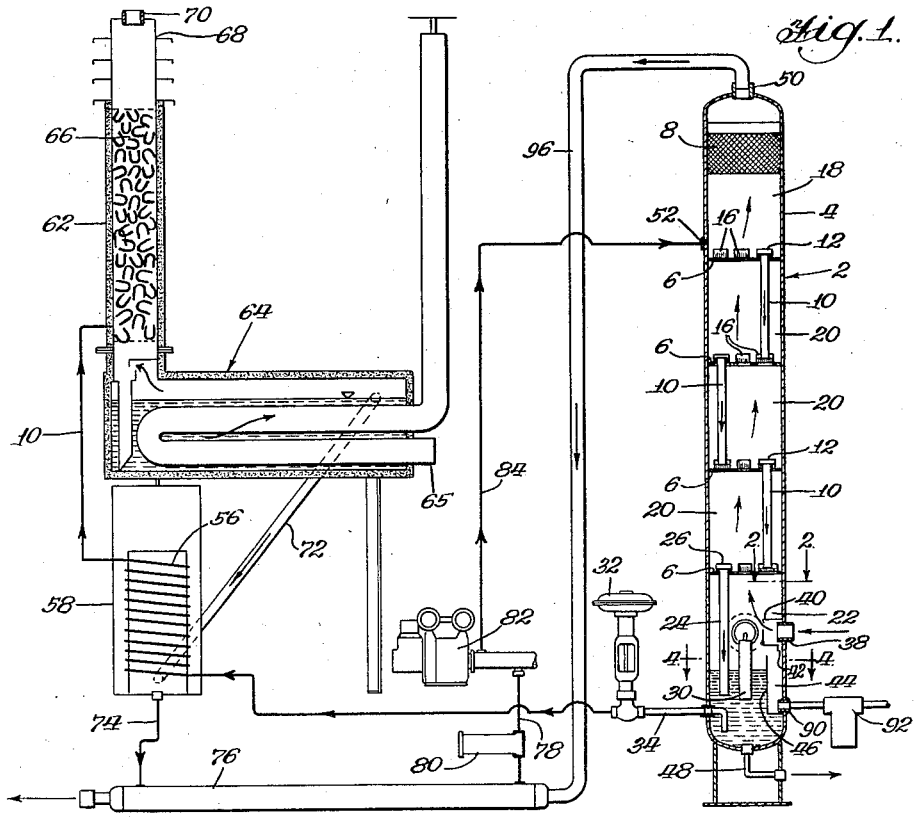
Figure 1 is a partially schematic illustration of the arrangement here under consideration.
Figure 2:
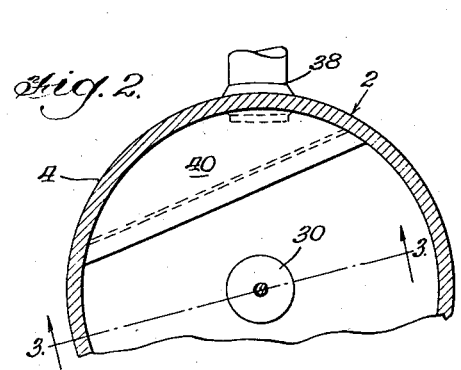
Figure 2 is a fragmentary sectional view taken approximately along lines 2—2 of Figure 1.
Figure 3:
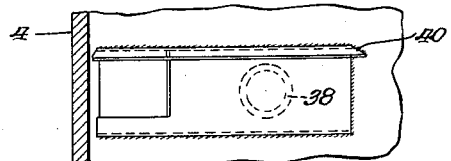
Figure 3 is a fragmentary sectional view taken along lines 3—3 of Figure 2.
Figure 4:
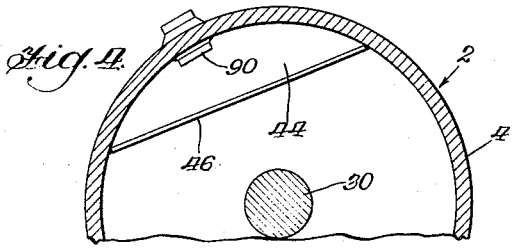
Figure 4 is a fragmentary sectional view taken along line 4—4 of Figure 1.

Describing the invention in detail and directing attention to Figure 1, it will be seen that an absorber tower 2, preferably comprising a vertical, hollow cylinder 4 having a plurality of bubble trays 6, 6 disposed therein and in vertically spaced relation to each other. A mist extractor 8 is located in the top of the shell 4 and may comprise a close knit meshed arrangement of any suitable material. Downcomer pipes 10, 10 are arranged intermediate the trays 6 and have their upper ends associated with open-ended cylindrical caps 12 which are secured to and extend above the related bubble trays 6. The lower ends of each pipe 10 is in slight spaced relation to the tray 6 immediately therebelow. The bubble trays 6 are additionally provided with a plurality of apertures which have open-ended cylindrical walls or abutments 16 therearound. The trays 6 in effect divide the shell 4 into an upper compartment 18, intermediate compartments 20, 20 and a lower compartment 22. A last downcomer pipe 24 extends into the lower compartment 22 and has its upper open end connected to a cylindrical cap 26 mounted in the immediately adjacent tray 6.

A float arrangement 30 is positioned in the lower compartment 22 and is operatively interlocked (not shown) with a motor valve and pump arrangement 32 which in turn is located in a line 34 connected to and communicating to the lower portion of the chamber 22. The chamber 22 is additionally provided with an inlet 38 to accommodate gas entrance. A baffle arrangement 40 is located immediately adjacent the inlet 38, said baffle arrangement having a lower opening 42 immediately above a distillate chamber 44 defined by a wall 46 which is secured to the inner periphery of the shell 4. A drain 48 may be provided in the lower end of the shell 4 and a gas outlet 50 at the upper end of the shell 4. A glycol entrance port 52 is arranged to communicate with the chamber 18 above the immediately adjacent bubble tray 6. Line 34 communicates with a plurality of coils 56 located in a reservoir 58 in the arrangement. From the coils 56 an additional line 60 establishes communication with a reboiler indicated generally at 64, said reboiler having heating tubes 65 therein and a stripper stack 62 extending thereabove. The stripper stack 62 is preferably packed with a plurality of ceramic saddles 66 and is also provided with a reflux head 68 at its upper end which in turn has a vapor vent 70 mounted thereon. The reboiler 64 is provided with an outlet pipe 72 which communicates with the reservoir 58. Another line 74 establishes communication between an outlet from the reservoir 58 and a heat exchanger 76. A further line 78 communicates with an outlet from the heat exchanger 76 and further has a filter arrangement 80 disposed therein. The line 78 communicates with a pump arrangement 82. The outlet side of the pump arrangement communicates with a line 84 which in turn communicates with the glycol entrance port 52 of the absorber tower 2.

In the operation of the arrangement, glycol is distributed by pump 82 to the line 84 whereat it enters the shell 2 through the port 52. The glycol spreads itself on the upper bubble tray 6 and until such time it spills over the cylinder 12 and downcomer pipe 10. It will be noted that the abutments 16 are arranged slightly above the cylinder 12 so that the glycol flow is entirely through the downcomer 10. Similar arrangements are present on the other trays 6 whereby the glycol flows through the associated downcomer 10 and over the trays 6 until such time as the downcomer 12 carries the glycol to the chamber 22 at the bottom of the absorber tower 2.

The gas to be treated enters inlet 38 and contacts the baffle 40. It will be noted that the gas coming through inlet 38 is at a comparatively high velocity, and, upon contacting the baffle arrangement 40, a considerable amount of the entrained hydrocarbons or distillates are separated from the gas and drain downwardly through the aperture 42 and to the distillate chamber 44. The gas then flows upwardly through the apertures which are surrounded by the cylindrical abutments 16 from chamber 22 through the intermediate chambers 20 and to the upper chamber 18. Upon entering the chambers 22 and 20, the velocity of the entering gas is considerably reduced and this reduction in velocity and consequent intimate contact of the gas with the bubbling glycol solution on the trays 6 induces a dehydration of the gas or removal of the water vapor therefrom and a further separation of entrained distillate therein. An additional similar separation of entrained distillate and water vapor occurs as the gas passes through the mist extractor 8 before reaching the gas outlet 50 and the here separated products will fall downwardly to mix with the glycol.

The glycol solution carried to the bottom of the chamber 22 now is diluted with water and distillate. Because the distillate has a specific gravity considerably less than the glycol water mixture, it naturally tends to accumulate at the top of the solution in the chamber 22. As the liquid level in the bottom of the tank rises, the distillate collected on the top thereof will spill over and into the chamber 44 whereat it is mixed with the previously separated distillate and then may be drained through the port 90 and into a distillate trap 92. From the trap 92 the distillate may be drained off manually or if desired an automatic power drain arrangement (not shown) of any conventional type may be employed.

As the float 30 moves upwardly, it actuates the motor valve arrangement 32 which provides a drain off of the glycol and water solution from the bottom of chamber 22. This solution is carried through the coils 56 in reservoir 58 and dumped via line 60 into the reboiler 64 whereat it is heated to a relatively high temperature. Upon heating of the solution both glycol and water vapors are driven from the surface thereof and move upwardly through the stripper stack 68 and into the reflux head 68. In the stripper stack and reflux head a major portion of the glycol vapors are condensed and separated from the water vapor and then flow downwardly into the reboiler.

From the reboiler 64 the now concentrated and heated glycol solution is carried via pipe 72 to the reservoir 58 whereat it may, by contact with coils 56, preheat the glycol and water solution in the coils 56.

The dehydrated gas leaves the absorber tower 2 via port 50 and is carried via line 96 to the heat exchanger 76. The line 74 carries the hot and concentrated glycol solution to the exchanger 76 whereat the intimate contact between the solution and the relatively cool gas therein cools the concentrated glycol solution whereby a cool, concentrated, and filtered solution is delivered via the line 78 to the pump arrangement 82. The pump, of course, delivers the glycol solution via line 84 to the absorber tower 2 and the cycle is repeated.

Figure 5:
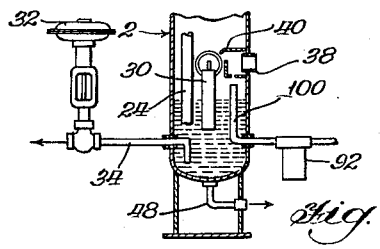
Figure 5 is a fragmentary view illustrating a modification of certain features of the invention.

Directing attention to Figure 5 which illustrates a slight modification that may be employed in the absorber tower, it will be seen that an upstanding pipe arrangement 100 is substituted for the chamber 44 of the earlier embodiment. The operation of this embodiment, however, is substantially the same as that above described.

Thus it will be seen that I have provided a novel arrangement which accomplishes the dehydration of natural gas in a simple and efficient manner. In addition, the arrangement provides for the elimination of distillate or liquid hydrocarbons with the consequent operative effects above described.

The invention as shown is by way of illustration and not limitation and may be subject to modification without departing from the spirit thereof or the scope of the appended claim.

What is claimed is:

In an absorber tower for use in an arrangement of the type described, a hollow vertically upstanding shell, a plurality of members in the shell dividing same into chambers including upper and lower chambers at the upper and lower extremities of the shell respectively, a gas inlet communicating with the lower chamber, a gas outlet communicating with the upper chamber, a glycol inlet port communicating with the upper chamber and below said gas outlet port, means to distribute the glycol over the members and allow same to flow downwardly to the lower chamber, a baffle plate device mounted on the inner periphery of the shell and arranged to be engaged by gas entering the shell through said gas inlet, said baffle device comprising a horizontal plate secured to the shell immediately below said gas inlet and a vertical plate mounted on an inner edge of said horizontal plate and spaced from and horizontally aligned with said gas inlet, a distillate collecting compartment in the lower chamber immediately below and vertically aligned with said horizontal plate, said ditsillate compartment having an upwardly facing opening, drain means establishing communication between said baffle device and said distillate collecting compartment comprising an aperture in said horizontal plate vertically aligned with said upwardly facing opening whereby distillate separated from said inlet gas by said baffle device will be carried to said distillate collecting compartment, said distillate collecting compartment including a weir edge at the upper portion thereof arranged to accommodate flow of stratified distillate on the top of the glycol in said lower chamber into said compartment, and drain means to remove distillate from said distillate collecting compartment.

References Cited in the file of this patent

UNITED STATES PATENTS

| | | |
|---|---|---|
| 2,735,506 | Glasgow | Feb. 21, 1956 |
| 2,787,451 | Lavery | Apr. 2, 1957 |